(12) United States Patent
Bauer et al.

(10) Patent No.: US 8,689,640 B2
(45) Date of Patent: Apr. 8, 2014

(54) METHOD AND DEVICE FOR SIMULATING A BODY THAT IS MOVED IN A TRANSLATIONAL OR ROTATIONAL MANNER

(75) Inventors: Robert Bauer, Graz (AT); Wolfgang Ettl, Graz (AT); Christian Gritsch, Heimschuh (AT); Michael Wastian, Preding (AT)

(73) Assignee: Kristl, Seibt & Co. Gesellschaft m.b.H., Graz (AT)

( * ) Notice: Subject to any disclaimer, the term of this patent is extended or adjusted under 35 U.S.C. 154(b) by 0 days.

(21) Appl. No.: 13/807,120

(22) PCT Filed: Nov. 8, 2011

(86) PCT No.: PCT/AT2011/000449
§ 371 (c)(1),
(2), (4) Date: Dec. 27, 2012

(87) PCT Pub. No.: WO2012/106737
PCT Pub. Date: Aug. 16, 2012

(65) Prior Publication Data
US 2013/0098147 A1    Apr. 25, 2013

(30) Foreign Application Priority Data
Feb. 9, 2011 (AT) .................................. A 172/2011

(51) Int. Cl.
*G01B 5/30* (2006.01)
(52) U.S. Cl.
USPC .......................................... 73/862.01; 73/760
(58) Field of Classification Search
USPC ................. 73/760, 862.01, 862.191, 862.322
See application file for complete search history.

(56) References Cited

U.S. PATENT DOCUMENTS

| | | | |
|---|---|---|---|
| 4,161,116 A | | 7/1979 | Fegraus et al. |
| 4,556,836 A | * | 12/1985 | Antognini ................. 318/696 |
| 5,060,176 A | * | 10/1991 | Nawa et al. .................. 701/51 |
| 5,747,960 A | * | 5/1998 | Quaggio ..................... 318/625 |
| 5,959,422 A | * | 9/1999 | Kang ........................... 318/561 |
| 2003/0141128 A1 | * | 7/2003 | Hessmert et al. ............. 180/233 |

FOREIGN PATENT DOCUMENTS

| | | |
|---|---|---|
| DE | 3423694 A1 | 1/1985 |
| DE | 102005004632 B3 | 5/2006 |
| JP | 4-009732 A | 1/1992 |
| JP | 2008-195270 A | 8/2008 |

OTHER PUBLICATIONS

International Search Report mailed Jan. 3, 2012; PCT/AT2011/000449.
Austrian Office Action dated Jun. 15, 2011.
International Preliminary Report on Patentability dated Nov. 8, 2011; PCT/AT2011/000449.

* cited by examiner

*Primary Examiner* — Max Noori
(74) *Attorney, Agent, or Firm* — Ladas & Parry LLP

(57) ABSTRACT

A method and a device for simulating a body that is moved in a translational or rotational manner. The method includes detecting a force that acts on the body or a torque ($M_W$), and assigning a reference mass or a reference moment of inertia ($J_{soll}$) to the body. The force or the torque ($M_w$) and the reference mass or the reference moment of inertia ($J_{soll}$) are used to determine a reference speed ($\omega_{soll}$) for a speed control which controls an actual speed ($\omega_{ist}$) using a control transmission function ($G(s)$), and the reference speed ($\omega_{soll}$) is determined by means of a transmission element using a transmission function ($P(s)$) that is reciprocally proportional to the control transmission function ($G(s)$).

10 Claims, 2 Drawing Sheets

METHOD AND DEVICE FOR SIMULATING A BODY THAT IS MOVED IN A TRANSLATIONAL OR ROTATIONAL MANNER

The invention relates to a method for simulating a body moved in a translational or rotational manner, wherein a force acting on said body or a torque acting on said body are detected, and a reference mass or a reference moment of inertia are assigned to said body, and wherein the force or the torque and the reference mass or the reference moment of inertia are used to determine a reference speed for a speed control which controls the actual speed using a control transmission function.

In addition, the invention refers to a device for simulating a body movable in a translational or rotational manner, having a measuring device to measure a force acting on said body or a torque acting on said body, which measuring device is connected to a calculating device designed to calculate a reference speed for a speed control device from the measured force or torque and a reference mass or reference moment of inertia assigned to said body, said speed control device being equipped with a control device having a control transmission function to control the actual speed.

A method for simulating a flywheel mass is e.g. known from U.S. Pat. No. 4,161,116 with respect to a roller type test stand for testing motor vehicles. The roller type test stand has a roller supporting a vehicle wheel, which roller is connected to a torque measuring device transmitting the measured torque to a computer. A test mass is provided to simulate the moment of inertia of the vehicle, which test mass is formed by a flywheel connected to a motor. As the tested vehicle may have a higher or lower moment of inertia than the test mass, the torque of the motor is controlled in accordance with the measured torque.

Consequently, any difference between the test mass and the system to be simulated is taken into account, by controlling the speed of the load machine accordingly. However, this method for simulating a flywheel mass, which is widely used in the art, has the disadvantage that speed control influences the dynamic behavior of the test mass; speed control has its own dynamic, which distorts the vehicle simulation. In particular, speed control mainly influences the simulation process in such a way that the dynamic simulated using the test mass is delayed with respect to the actual system, i.e. the test mass lags behind the actual system. Consequently, a simulation of dynamic processes will be faulty, which should be avoided to imitate vehicle behavior as realistically as possible. In addition, under certain test conditions, the dynamic of speed control may even cause instabilities in the simulation process which would not happen in the actual system. Thus, the known flywheel mass simulation comprising controlling the number of revolutions has only limited applicability.

DE3347182A1 discloses another method for simulating flywheel masses on test benches, wherein a test specimen, e.g. an internal combustion engine, is rigidly connected to a direct current machine simulating the load. The mechanical moment of the test specimen is detected by means of a sensor. The reference acceleration of the electrical machine is calculated from the measured moment and the required moment of inertia. Said reference acceleration is compared to actual acceleration, which is calculated from the measured changes in the number of revolutions of the machine. The moment of the electrical machine is readjusted according to this difference. In order to determine the reference acceleration of the machine, the mechanical moment of the test specimen is transmitted to a smoother element. Subsequently, division by the desired moment of inertia yields a value corresponding to the required reference acceleration of the machine. Basically, this method also uses control of the number of revolutions of the direct current machine, which has the disadvantages mentioned with reference to U.S. Pat. No. 4,161,116. The smoother element cannot overcome these disadvantages.

DE4427966A1 discloses a different type of procedure for simulating mass in a fixed test bench, wherein a load device coupled to a test object is controlled. A torque reference value is deducted from the actual speed by differentiation in a differentiation element and attenuation in a controlled timing element. The reference torque value is compared to the actual torque value derived from a torque sensor by means of a control device. A correcting moment is created if the reference torque value differs from the actual torque value. The timing element determines a time constant, which is proportional to a variable mass moment of inertia of the test object or the testing device. This design is supposed to prevent control circuit instability.

The aim of the present invention is to provide a simply implementable, stable method as described above, eliminating or at least considerably reducing the influence of the control of the number of revolutions on the dynamic behavior of the body moved in a rotational or translational manner. In addition, the invention provides a device of simple construction as described above, allowing the dynamic behavior of a moved body to be simulated precisely.

In the method mentioned above, this aim is achieved by determining the reference speed by means of a transmission element comprising a transmission function that is reciprocally proportional to the control transmission function.

In other words, in order to imitate the dynamic behavior of a rotating body, a reference moment of inertia is pre-set, which may differ from the available moment of inertia of the rotating body. This difference between the pre-set reference moment of inertia and the available moment of inertia is balanced by controlling the speed of the rotating body. This speed control receives a reference speed as an input, said reference speed being determined from the torque of the rotating body and the reference moment of inertia. In terms of control technique, the function of the speed control is described as a complex transmission function defined as the relationship between output behavior and input behavior of the respective control system, i.e. between the reference speed and the actual speed of the rotating body. In order to eliminate the disturbing influence of speed control on the simulation of the dynamic behavior of the rotating body, said transmission element has a transmission function reciprocal or indirectly proportional to the control transmission function to determine the reference speed. Consequently, said transmission element has a dynamic that is diametrically opposed to the speed control dynamic, thus disengaging the entire simulation process from the influence of speed control. Thus, the time behavior introduced into the entire control circuit by speed control is compensated by the upstream transmission element. Compared to the known simulation methods, this has the advantage that the rotating body may simulate a reference moment of inertia differing from the available moment of inertia without causing a time delay between the dynamic behavior of the tested body and the dynamic behavior of the simulated system. Prior art mass simulations have the problem that the simulated dynamic behavior lags behind the actual behavior, but the present method reliably avoids this problem. Consequently, flywheel mass may be simulated particularly exactly, which is of particular advantage when the rotating body is used to examine the properties of a system differing therefrom without examining the system itself. The above explanations apply correspondingly to the simulation of translationally moved bodies simply by using the corresponding physical values, particularly force, mass, and speed. Any references hereinafter to features of the present invention for the simulation of rotationally moved bodies naturally also encompass translationally moved bodies to which analogous considerations apply, apart from the use of corresponding values.

In order to compensate for the dynamic of speed control in the control system, the transmission element advantageously has an integrating element to determine the reference speed and a compensation element inverse to the control transmission function. The torque acting on the rotating body, which torque may be composed of various components depending on the set-up, is related to angular acceleration according to the law or principle of conservation of angular momentum. If the body is moved translationally, the principle of linear momentum applies analogously. In the integrating element, (angular) speed is determined by integrating (angular) acceleration. The method for determining speed from the measured torque using the principle of conservation of angular momentum is extended such that the integrating element is connected to a compensating element having a transmission behavior inverse to the control transmission function, so that the dynamic of speed control is compensated when looking at the control circuit as a whole. Of course, said integrating element may—like all the other control circuit components—be used for summing up time-discreet values.

In order to compensate the dynamic of torque and speed control in the transmission element, reference speed is advantageously determined by means of a transmission function reciprocally proportional to a control transmission function of the $n^{th}$ degree, particularly of the $1^{st}$ or $2^{nd}$ degrees.

In a particularly preferred embodiment allowing the use of standard components, the transmission function of the transmission element essentially corresponds to that of a PI controller. Such PI controller is known to be composed of components of a (proportional) P element and an (integrating) I element having a certain time constant.

For simulating a translationally or rotationally moved body, it is advantageous for the body to be a load machine simulating the dynamic behavior of a machine element, particularly of a flywheel mass. Said load machine simulates the behavior of the machine element, which may be replaced by said load machine. Said load machine may have a moment of inertia differing from the machine element to be simulated. For example, this is the case when the moment of inertia of the machine element to be simulated is very high, so that a load machine having the appropriate moment of inertia could not generate the torque required for simulation.

In order to achieve a precisely working torque and speed control, it is useful to perform disturbance variable compensation when controlling the number of revolutions.

In addition, the aim of the present invention is achieved by a device as specified above, wherein the calculating device for determining the reference speed has a transmission element having a transmission function reciprocally proportional to the control transmission function. Thus, the same advantages and technical effects as in the method according to the present invention may be achieved. Therefore, the explanations above apply here as well.

In a particularly preferred embodiment, the body is a load machine designed to imitate the dynamic behavior of a machine element, particularly a flywheel mass. In particular, such device is part of a test bench as known in the art in various embodiments, particularly as a roller type test stand or a wheel test bench.

Hereinafter, the present invention will be described in greater detail using an example shown in the drawings; however, the invention is not restricted thereto.

Figure 1:
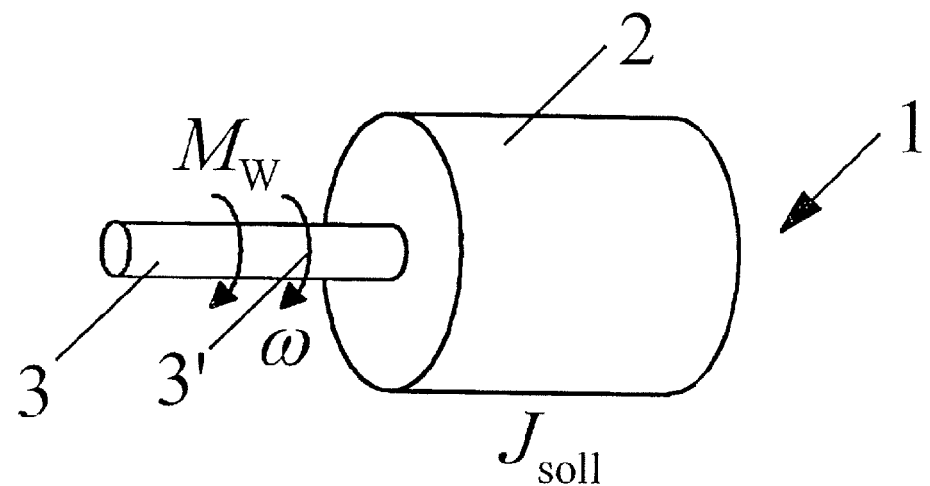
FIG. 1 is a schematic representation of a flywheel mass the dynamic behavior of which is simulated.

FIG. 1 shows a rotationally moved body 1 having a flywheel mass 2 having a (reference) moment of inertia $J_{soll}$. Flywheel mass 2 is connected to a shaft 3 to which a torque $M_W$ is applied, causing the flywheel mass 2 to rotate in the direction of arrow 3' at an (angular) speed ω. The law or principle of conservation of angular momentum gives the relationship between torque $M_W$ and (angular) acceleration according to equation (1).

$$J_{soll}\frac{d\omega}{dt} = M_w \tag{1}$$

Equation (1) is the basis of any flywheel mass simulation wherein speed ω is derived from the measured torque $M_W$ and the reference moment of inertia $J_{soll}$. This is achieved by transforming and integrating equation (1), yielding speed ω if the reference moment of inertia $J_{soll}$ is known. The transition between torque $M_W$ and speed ω may be described in a known manner by reference transmission function $T_{soll}(s)$ having complex variable s. See equation (2) giving the actual behavior of flywheel mass 2 which is to be imitated as closely as possible in the simulation.

$$T_{soll}(s) = \frac{\omega(s)}{M_W(s)} = \frac{1}{J_{soll}s} \tag{2}$$

Depending on the embodiment of the simulated system, additional moments may act on the rotationally moved body 1. These moments may be examined using respective test benches known in the art as explained hereinafter using two examples.

Roller type test stands known in the art may be used to simulate the behavior of a vehicle, taking into account friction and air resistance. In this case, the principle of conservation of angular momentum used in equation (1) for a machine element having a (shaft) moment $M_W$ is extended to equation (3) wherein $J_v$ is the moment of inertia of the vehicle and $M_{RL}$, is a moment corresponding to driving resistance.

$$J_v\frac{d\omega}{dt} = M_W - M_{RL} \tag{3}$$

According to equation (4), moment $M_{RL}$ is given as a function of angular speed with coefficients A, B, C for friction and air resistance.

$$M_{RL} = A + B\omega + C\omega^n \tag{4}$$

In prior art, wheel test benches are known to imitate the behavior of a vehicle wheel. In this case, the law of conservation of angular momentum is extended to equation (5)

including moment $M_{FX}$ corresponding to the force transmitted to the ground, and moment $M_{Reib}$ corresponding to rolling friction.

$$J_{Rad} \frac{d\omega}{dt} = M_W - M_{Fx} - M_{Reib} \tag{5}$$

Of course, these examples are modifyable in a variety of ways depending on the simulation.

Figure 2:
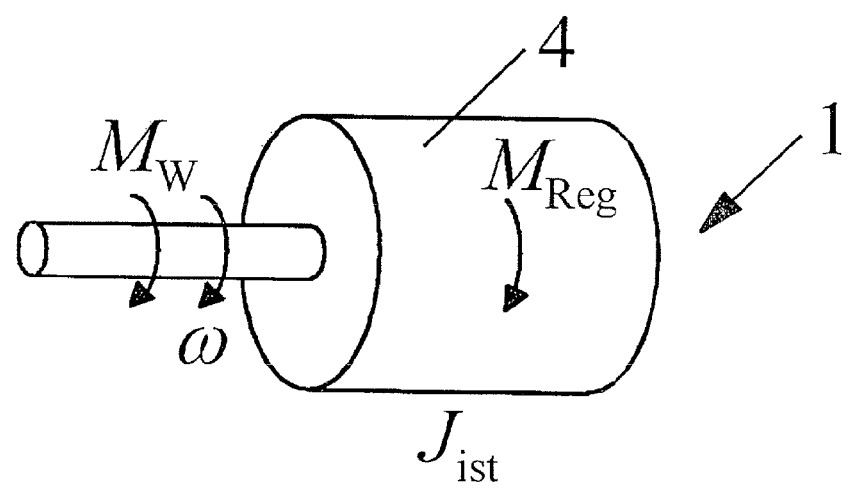
FIG. 2 is a schematic representation of a load machine simulating the flywheel mass shown in FIG. 1.

FIG. 2 is a schematic representation of a load machine 4 used to simulate the body 1 shown in FIG. 1 in the form of a flywheel mass 2. Said load machine 4, which may be part of a test bench (not shown), has a moment of inertia $J_{ist}$, which may differ from the desired reference moment of inertia $J_{soll}$ of body 1. For example, this may happen if moment of inertia $J_{soll}$ is so large or small that a load machine 4 having the appropriate moment of inertia could not generate or receive the required torque. The number of revolutions or speed of load machine 4 is controlled in order to balance the difference between the available moment of inertia $J_{ist}$ of load machine 4 and the moment of inertia of body 1 to be simulated. Depending on the control deviation between reference speed $\omega_{soll}$ and actual speed $\omega_{ist}$ of load machine 4, an additional control moment $M_{Reg}$ is generated, which is applied to load machine 4 to equalize actual speed $\omega_{ist}$ with reference speed $\omega_{soll}$.

Figure 3:
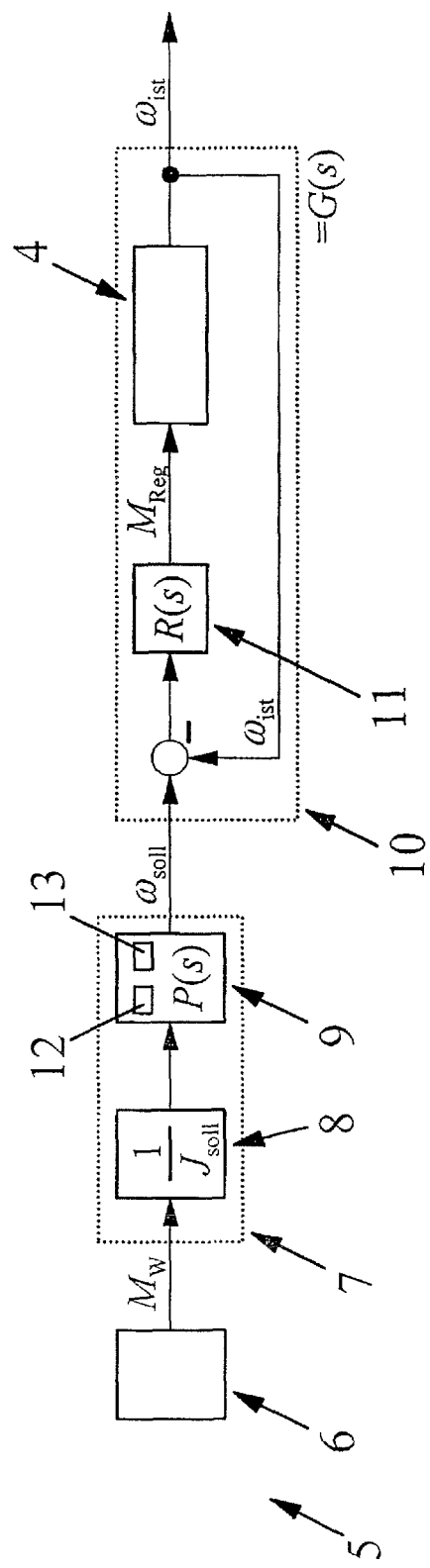
FIG. 3 is a schematic representation of a control circuit according to a preferred embodiment of the present invention having a speed control for the load machine and a transmission element having a compensating element to compensate speed control dynamic.

FIG. 3 is a schematic representation of the control scheme of mass simulation implemented in a device 5 of a test bench (not shown). Said device 5 has a measuring device 6 measuring torque $M_W$ acting on body 1. Said measuring device 6 is connected to a calculating device 7 having a module 8 containing the predetermined reference moment of inertia $J_{soll}$ of body 1. Calculating device 7 additionally has a transmission element 9 determining a reference speed $\omega_{soll}$ from the measured torque $M_W$ and reference moment of inertia $J_{soll}$. Said reference speed $\omega_{soll}$ is transmitted to speed control device 10. Said speed control device 10 has a control 11 determining an appropriate control moment $M_{Reg}$ according to the control deviation between reference speed $\omega_{soll}$ and actual speed $\omega_{ist}$. Said control moment $M_{Reg}$ is generated by load machine 4 to readjust the actual speed $\omega_{ist}$ according to reference speed $\omega_{soll}$.

The transition between reference speed $\omega_{soll}$ and actual speed $\omega_{ist}$ of the speed control is defined by a control transmission function G(s) with variable s of complex value as defined in equation (6).

$$G(s) = \frac{\omega_{ist}(s)}{\omega_{soll}(s)} \tag{6}$$

Consequently, the dynamic behavior of mass simulation between input (torque $M_W$) and output (actual speed $\omega_{ist}$) of the control circuit may be determined from equation (2) and equation (6) according to equation (7).

$$\frac{\omega_{ist}(s)}{M_W(s)} = \frac{1}{J_{soll}(s)} G(s) \tag{7}$$

As can be seen in equation (7), speed control results in a deviation between simulated behavior according to equation (7) and actual behavior of flywheel mass 2 to be simulated according to equation (2). In other words, the simulated mass lags behind the actual mass by speed control function G(s) of the speed control, so that dynamic processes on the test bench would be imitated wrongly if the transmission function were implemented according to equation (7). In addition, in certain cases of application (e.g. in case of a rigid, slightly cushioned connection of a second moment of inertia) the mass simulation would become instable although the behavior of the actual system would be stable.

In order to minimize or completely eliminate the influence of speed control on the simulation of dynamic processes, transmission element 9 has a transmission function P(s) reciprocally proportional to control transmission function G(s). For this purpose, transmission member 9 has a "1/s" or integrating element 12 and a compensation element 13 inverse to control transmission function G(s). Consequently, transmission element 9 has a transmission function P(s) according to equation (8)

$$P(s) = \frac{1}{sG(s)} \tag{8}$$

Consequently, a transmission function $T_{ist}(s)$ according to equation (9) is obtained for the transition between measured torque $M_W$ and actual speed $\omega_{ist}$. Advantageously, said transmission function $T_{ist}(s)$ exactly corresponds to the actual behavior according to equation (2).

$$T_{ist}(s) = \frac{\omega_{ist}(s)}{M_W(s)} = \frac{1}{J_{soll}sG(s)} G(s) = \frac{1}{J_{soll}s} \tag{9}$$

Consequently, the use of transmission function P(s) allows flywheel simulation to be disengaged from the dynamic of control of number of revolutions or speed control determined by transmission function G(s). Thus, compensation element 13 of transmission element 9 is designed to compensate the dynamic of speed control. For this purpose, transmission function P(s) of transmission element 9 replaces the conventionally used integrator, which is derived from the application of the principle of conservation of angular momentum according to equation (1).

In one embodiment, speed control device 10 has control transmission function G(s) of the $1^{st}$ degree, which is defined by coefficients $a_0$ and $b_0$ according to equation (10), which coefficients may be selected freely depending on application.

$$G(s) = \frac{b_0}{s + a_0} \tag{10}$$

This results in transmission function P(s) according to equation (11) for transmission element 9.

$$P(s) = \frac{1}{sG(s)} = \frac{s + a_0}{b_0 s} = \frac{1}{b_0} + \frac{a_0}{b_0} \frac{1}{s} \tag{11}$$

Equation (11) immediately shows that the transmission function P(s) essentially corresponds to that of a simple PI controller, so that calculating device 7 may advantageously be composed of inexpensive, easily implementable standard modules.

In an alternative embodiment, speed control has a $2^{nd}$ degree transmission function defined generally by coefficients $a_0$, $a_1$, $b_0$, $b_1$ according to equation (12), which coefficients may be selected freely depending on their application.

$$G(s) = \frac{b_1 s + b_0}{s^2 + a_1 s + a_0} \quad (12)$$

This results in a transmission function P(s) of transmission member 9 according to equation (13).

$$P(s) = \frac{1}{sG(s)} = \frac{s^2 + a_1 s + a_0}{b_1 s^2 + b_0 s} \quad (13)$$

The mass simulation explained above with reference to rotating body 1 is analogously applicable to bodies moved in a translational manner, with the basic calculation models only differing in the use of respective physical values (mass instead of moment of inertia, acceleration instead of angular acceleration, etc.).

The invention claimed is:

1. A method for simulating a body moved in a translational or rotational manner, wherein a force acting on said body or a torque ($M_W$) acting on said body are detected, and a reference mass or a reference moment of inertia ($J_{soll}$) are assigned to said body, and wherein said force or torque ($M_W$) and said reference mass or reference moment of inertia ($J_{soll}$) are used to determine a reference speed ($\omega_{soll}$) for speed control controlling an actual speed ($\omega_{ist}$) using a control transmission function (G(s)), wherein said reference speed ($\omega_{soll}$) is determined by means of a transmission element using a transmission function (P(s)) reciprocally proportional to said control transmission function (G(s)).

2. The method according to claim 1, wherein said transmission element has an integrating element and a compensation element inverse to said control transmission function (G(s)) for determining the reference speed ($\omega_{soll}$).

3. The method according to claim 1, wherein said reference speed ($\omega_{soll}$) is determined by means of a transmission function (P(s)) reciprocally proportional to a control transmission function of the $n^{th}$ degree.

4. The method according to claim 3, wherein said transmission function (P(s)) of said transmission element essentially corresponds to the transmission function of a PI controller.

5. The method according to claim 1 a load machine is used as said body to simulate the dynamic behavior of a machine element, particularly a flywheel mass.

6. The method according to claim 1, wherein disturbance variable compensation is performed in control of the number of revolutions.

7. A device for simulating a body movable in a translational or rotational manner, said device having a measuring device for measuring a force acting on said body or a torque ($M_W$) acting on said body, said measuring device being connected to a calculating device designed to derive a reference speed ($\omega_{soll}$) for a speed control device from the measured force or torque ($M_W$) and a reference mass or reference moment of inertia ($J_{soll}$) assigned to said body, said speed control device having a control device having a control transmission function (G(s)) to control an actual speed ($\omega_{ist}$), wherein said calculating device for calculating the reference speed ($\omega_{soll}$) has a transmission element having a transmission function (P(s)) reciprocally proportional to said control transmission function (G(s)).

8. The device according to claim 7, wherein a load machine is used as said body arranged to simulate the dynamic behavior of a machine element, particularly of a flywheel mass.

9. The method according to claim 3, wherein said reference speed ($\omega_{soll}$) is determined by means of a transmission function (P(s)) reciprocally proportional to a control transmission function of the $1^{st}$ degree.

10. The method according to claim 3, wherein said reference speed ($\omega_{soll}$) is determined by means of a transmission function (P(s)) reciprocally proportional to a control transmission function of the $2^d$ degree.

* * * * *